United States Patent Office 3,772,296
Patented Nov. 13, 1973

3,772,296
VAT DYESTUFFS: ARYLOXYPYRIMIDINYL-ANTHRAQUINONE DERIVATIVES
Paul Ulrich and Max Staeuble, Basel, Fritz Kugler, Muttenz, and Max Jost, Oberwil, Basel-Land, Switzerland, assignors to Ciba-Geigy AG, Basel, Switzerland
No Drawing. Filed Apr. 16, 1970, Ser. No. 29,245
Claims priority, application Switzerland, Apr. 23, 1969, 6,152/69; Mar. 3, 1970, 3,271/70
Int. Cl. C07d 51/36
U.S. Cl. 260—256.4 C         8 Claims

ABSTRACT OF THE DISCLOSURE

The invention relates to dyestuffs of the general formula

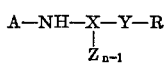

in which A represents a vattable residue, X a heterocyclic residue containing two cyclic nitrogen atoms which is bound with the —NH— group to a cyclic carbon atom directly or via a —CO— group, Y represents an oxygen or a sulphur atom, R represents an aromatic residue which is free from azo groups and is bound to the oxygen or sulphur atom Y through a carbon atom of the aromatic nucleus, which are suitable for vat and pigment dyeing. The dyeings obtained are distinguished by their good wet fastness and light fastness properties.

---

The present invention relates to vat and pigment dyestuffs and to a process for their preparation.

The present invention provides vat and pigment dyestuffs of the general formula

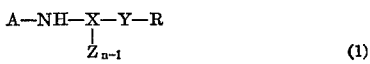

in which A represents a vattable residue, X a heterocyclic residue containing two cyclic nitrogen atoms, which is bound with the —NH— group by a cyclic carbon atom directly or through a —CO— group, Y represents an oxygen or a sulphur atom, R represents an aromatic residue free from azo groups which is bound with the oxygen or sulphur atom Y through a carbon atom of the aromatic nucleus, and, when R represents a heterocyclic aromatic residue, it is a heterocyclic aromatic residue of at least 6 members, and Z represents a residue —NH—A′ or a residue —Y—A′ in which Y has the meaning defined above, A′ represents a vattable residue, and $n=1$ or 2, with the proviso that, when X is a pyrimidine residue and Z is a residue —NH—A′ and A and A′ are unsubstituted anthraquinone residues, —Y—R must not represent an unsubstituted phenoxy residue.

As vattable residues A and A′ there may be mentioned residues of polycyclic quinones, for example, of indanthrones, pyranthrones or dibenzanthrones or especially of phthaloylacridones and more especially of anthraquinones.

As heterocyclic residues X there are suitable both simple cyclic compounds and heterocyclic compounds that contain fused-on rings. Of special value are dyestuffs of the Formula 1 in which the residue X is a quinoxaline-CO, quinazoline-CO or phthalazine-CO residue or especially a pyrimidine residue. The residue X may be bound to the —NH-bridge through a —CO— group, as for example, in the compound of the formula

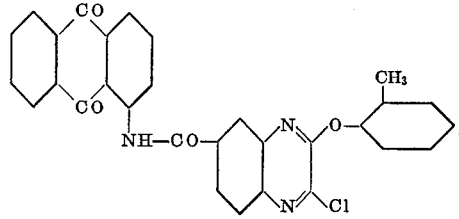

but X is generally bound to the —NH-bridge directly through a cyclic carbon atom.

The aromatic residue R is preferably a benzene, naphthalene or anthraquinone residue. The residue R may be substituted in the aromatic nuclei. Further suitable residues R are heterocyclic aryl residues or aryl residues with fused-on heterocycles. However, R must not contain an azo group. When in the Formula 1 $n=2$ and Z represents a group —NH—A′, the residues A and A′ may be identical or different, but the dyestuffs preferably contain identical residues A and A′, especially anthraquinone residues. The anthraquinone residues may be bound to the —NH-bridge in the 1 or 2 position. Valuable dyestuffs are those which contain the residue of a methoxyanthraquinone, for example, of 1-amino-4-methoxyanthraquinone, or the residue of a halogenated anthraquinone, for example, fo 1-amino-2-, -3- or -4-chloroanthraquinone or of 2-amino-3- or -4-chloroanthraquinone, and in which R represents a benzene group which may be substituted by one or more halogen atoms, or by hydroxyl, carboxy, alkyl, aryl, aralkyl, carboxylic acid amide or carbalkoxy groups, or a heterocyclic residue or an anthraquinone residue.

Further valuable dyestuffs of the Formula 1 are those which contain as residues A and A′ preferably identical unsubstituted anthraquinone residues.

Those dyestuffs which contain the residue of an acylated anthraquinone, for example, of 1-amino-4- or -5-benzoylaminoanthraquinone, or dyestuffs that contain two identical residues of the kind mentioned are also valuable. The term "heterocyclic aromatic residue containing at least 6 members" describes one that either represents a heterocyclic aromatic system, for example, the triazine ring (1,3,5), or a heterocyclic residue that contains a fused-on aromatic residue, for example the coumarine residue. In this case, too, the residue may be substituted. When in the General Formula 1 $n=2$ and Z represents a residue —Y—A′, in which Y represents an oxygen or a sulphur atom, R is not subject to any limiting condition. It should also be specially stressed that it is possible for A, A′ and R each to represent an anthraquinone residue. When $n=1$, the dyestuffs of the Formula 1 become dyestuffs of the formula

where A, R, X and Y have the same meanings as in Formula 1. As an example there may be mentioned a dyestuff of the formula

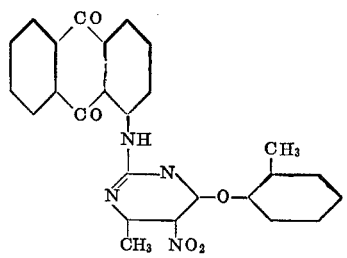

However, such dyestuffs of the Formula 2 may also contain in the residue R a halogen atom, as is the case, for example, with the dyestuff of the formula

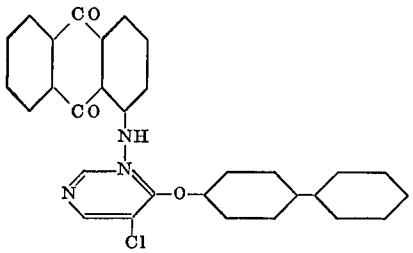

The present invention also provides a process for preparing the dyestuffs of the Formula 1 by a method known per se, which comprises condensing a heterocyclic compound containing two cyclic nitrogen atoms, which compound contains at least two substituents that are easy to eliminate, for example methanesulphonyl groups or halogen atoms, with a polycyclic quinone containing condensible groups, for example, the $H_2N$ group and aromatic hydroxy or mercapto compounds. The heterocyclic compounds may contain as further substituents, for example, alkyl or aryl residues, amino groups, for example, alkylamino groups, arylamino groups or the $H_2N$ group, or etherified hydroxyl or mercapto groups, for example, alkoxy groups, alkylmercapto or arylmercapto groups, nitro, cyano or ClCO groups. After the dyestuff of the Formula 1 has been manufactured, it is possible, if desired, to introduce further substituents or to eliminate existing substituents in the residues A, A' and R.

As heterocyclic compounds suitable for the manufacture of the dyestuffs according to this invention there may be mentioned:

chlorored acid chloride, 2,4-dichloropyrimidine, 3,6-dichloropyridazine, 3,6 - dichloropyridazine-5-carboxylic acid chloride, tetrachloropyridazine, 4,5-dichloropyridazon-(6)-yl-propionic acid chloride, 4,5-dichloro-1-phenylpyridazone-carboxylic or -sulphonic acid chloride, 4,5-dichloropyridazone-propionic acid chloride, 1,4-dichlorophthalazinecarboxylic- or -sulphonic acid chloride, 2,3 - dichloroquinoxalinocarboxylic or sulphonic acid chloride, 2,4-dichloroquinazolinecarboxylic- or sulphonic acid chloride, 2,4,6-trichloro- or 2,4,6-tribromopyrimidine, and their derivatives containing, for example, in the 5-position a cyano, nitro, methyl, ethyl, carbamide, sulphamide, carbomethoxy, carbalkoxy, acyl (for example, benzoyl, acetyl, or propionyl), alkenyl (for example, allyl or chlorovinyl), or a substituted alkyl (for example, carboxymethyl, chloromethyl or bromomethyl) group, 2,4,5,6-tetrachloro- or 2,4,5,6-tetrabromopyrimidine, 2,6 - dichloro- or 2,6-dibromo-4-carbethoxypyrimidine, 2,4,5 - trichloropyrimidine, 5 - nitro-6-methyl - 2,4 - dichloropyrimidine, 2,4-dichloropyrimidine - 6 - carboxylic acid chloride, 2,4-dichloropyrimidine - 5 - carboxylic acid chloride, 2,6-dichloro- or 2,6-dibromopyrimidine-4- or -5-carboxamides or sulphonamides or -4- or -5-carboxylic or -sulphonic acid chloride, 2,4-dichloropyrimidine-5-sulphonic acid, 2,4-dichloro-5-chloromethyl - 6 - methylpyrimidine, 2,4-dibromo-5-bromomethyl - 6 - methylpyrimidine, 2,4 - dichloro-5-chloromethyl-pyrimidine, 2,4 - dibromo - 5 - bromomethylpyrimidine, 2,5,6-trichloro-4-methylpyrimidine, 2,6 - dichloro - 4 - trichloromethylpyrimidine or especially 2-methanesulphonyl-4,5-dichloro - 6 - methylpyrimidine, 2,4-dimethanesulphonyl-5-chloro-6-methylpyrimidine.

As hydroxy or mercapto compounds suitable for the manufacture of the dyestuffs of the Formula 1 there may be mentioned:

2-hydroxynaphthalene, pentachlorothiophenol, 1-hydroxy-4-phenylbenzene, 1-hydroxy - 3 - methyl-6-isopropylbenzene, 1,2-dihydroxy - 4 - (1,1-dimethylethyl)-benzene, 1-hydroxy-2-methyl-4,6 - dichlorobenzene, 1-hydroxy-4-nitrobenzene 1-hydroxy - 2 - chloro-4,6-dinitrobenzene, 1-hydroxy - 2,4,6 - trichlorobenzene, 1-hydroxy-4-methoxybenzene, o-, m- and p-cresol, xylenols, o- and p-chlorophenol, salicyclic acid, 1-hydroxybenzene-4-carboxylic acid, 2-hydroxynaphthalene - 3 - carboxylic acid, 1-hydroxybenzene - 4 - sulphonic acid, 1-hydroxy-2-chlorobenzene - 4 - sulphonic acid, 2-phenylethyl alcohol, pentachlorophenol, 1-hydroxy-2-phenylbenzene, 1-hydroxy - 3 - (4-methylphenylamino)-benzene, 1-hydroxy-4-carbopropylhydroxybenzene, 4 - hydroxycoumarin, 8 - hydroxyquinoline, 2 - hydroxyanthraquinone, 2-mercaptoanthraquinone, 2-mercaptonaphthalene, 1-hydroxy-4-(4-methylphenyl - sulphonamido)anthraquinone, 1 - hydroxy - 2 - isopropyl-4-chloro-5-methylbenzol, 1-hydroxy - 2 - chloro-4-phenylbenzene, 1-mercapto-2-carboxybenzene, 1-hydroxy-2,3,5-trimethylbenzene, hydroxybenzene, 1-hydroxy-4-(anthraquinoyl(1)-aminocarbonyl) - benzene, also polyvalent hydroxy or mercapto compounds containing at least two condensible OH groups, cyclic compounds with glucosidic linkage, and more especially aromatic or heterocyclic compounds which contain at least 2 hydroxyl groups with mobile hydrogen atoms, for example, di- and trihydroxybenzenes, for example, resorcinol, hydroquinone and their substitution products, phloroglucinol, pyrogallol and substitution products, dioxydiphenyl derivatives, dihydroxynaphthalenes or naphthoquinones, for example, 1,4-dihydroxynaphthalene or naphthazarine, dioxyanthracenes, for example, rufol (1,5), chrysazole (1,8), dioxychrysene, dioxyanthraquinones and their substitution products, for example, quinizarine (1,4), anthraufin (1,5), chrysazin (1,8), purpurin (1,2,4-tri), flavopurpurin (1,2,6-tri), anthrapurpurin (1,2,7-tri), polyhydroxy compounds, for example, hexoses, cellobiose, cellulose, and especially also polyhydroxyanthraquinones, 1,2,5,8-tetrahydroxyanthraquinone (=alizarin bordeaux), 1,2,4,5,6,8 - hexahydroxyanthraquinone (=anthracene blue), dioxyindanthrone, dioxyindanthrone, dioxybenzanthrone, dioxyisodibenzanthrone, dioxy-bi-phenyl-perylene-tetracarboxylic acid diimide or, for example, compounds of the formulae

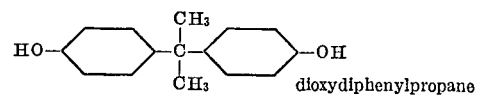

dioxydiphenylpropane

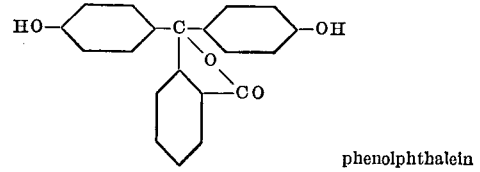

phenolphthalein

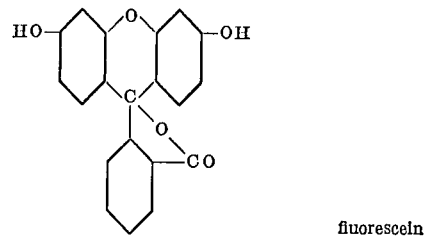

fluorescein

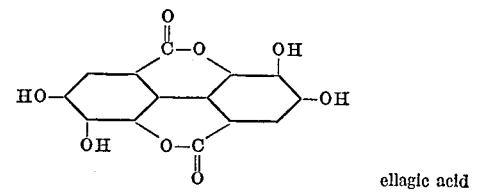

ellagic acid 1,3-, 1,4- and 1,5-dihydroxynaphthalene, 2,6-dihydroxytoluene, di- or trihydroxy- or -mercaptoheterocycles, for example, 2-phenyl-4,6-dihydroxytriazine, 2,4,6-trihydroxy-pyrimidine, 2,4,6-trihydroxy-triazine, 3,6-dihydroxypridazine, 1,4-dihydroxyphthalazine, 1,3-dihydroxyquinazoline, 2,3-dihydroxyquinoxazoline, 2,5-dimercapto-1,3,4-thiadiazole, 3,6-dihydroxy-1,2,4-trimethylbenzene, 4-methyluracil, di-β-naphthol, tetrahydroxy-biphenyl, trioxybenzoic acid.

Instead of a dihydroxy or dimercapto compound there may be used a compound that contains both a hydroxyl and a mercapto group, for example, 2-mercapto-4-hydroxypyrimidine, 2-thiouracil or 4-methylthiouracil.

Among the polycyclic quinones the vattable ones are of special importance. To manufacture the dyestuffs according to this invention a quinone that contains condensible substituents, for example, primary or secondary amino groups, is reacted by a method known per se with the afore-mentioned compound containing readily eliminable substituents, for example halogen atoms. To the vattable quinones belong those chromophores which are converted by reduction into a so-called leuco form or vat which has better affinity for both natural and regenerated cellulose fibres than the unreduced form and which can be reconverted by oxidation into the original chromophoric system. Accordingly, no polycyclic quinones of the type of 1-amino-4-arylaminoanthraquinone-2-sulphonic acid are used in the present process because, while they do lend themselves to reduction, they are so extensively modified chemically by the reduction that they can no longer be reconverted into the original chromophoric system. As examples of vattable compounds there may be mentioned: naphthalene-tetracarboxylic acid imides, as well as polycyclic quinones, for example, perylene-tetracarboxylic acid imides, especially the phenylimides, anthrapyrimidines, anthrapyridones, isothiazoleanthrones, quinazoline-anthraquinones, oxazole-anthraquinones, thiazole-anthraquinones, oxidazole-anthraquinones, anthraquinoyl-triazoles, pyrazole-anthraquinones, dipyrazole-anthronyls, pyrazino-anthraquinones, azabenzanthrones, indanthrones, thioxanthroneanthraquinones, anthrimides, anthrimidecarbazoles, dihydroacridines, anthanthrones, pyranthrones, dibenzpyrenequinones, dibenzanthrones, isodibenzanthrones, flavanthrones, acedianthrones and especially anthraquinone-acridones and the anthraquinones themselves, which term includes not only derivatives containing pure 9,10-dioxoanthracene rings but also those containing, for example, thiopanthrone residues as well as anthraquinone compounds that contain 9,10-dioxoanthracene rings and may contain the conventional substituents, for example, halogen atoms, alkoxy groups, alkyl groups, sulphonamide groups, sulphone groups or acylamino groups and, if desired, further fused-on or fused-in carbocycles and heterocycles. As examples of suitable quinones that contain condensible amino groups there may be mentioned:

1-amino-2-chloroanthraquinone,
1-amino-3-chloroanthraquinone,
2-amino-3-chloroanthraquinone,
1-amino-5-chloroanthraquinone,
2-amino-4-chloroanthraquinone,
1-amino-4-chloroanthraquinone,
1-amino-6-chloroanthraquinone,
1-amino-8-chloroanthraquinone,
1-amino-3-chloro-6-methylanthraquinone,
1-amino-6,7-dichloroanthraquinone,
1-amino-4-benzoylaminoanthraquinone,
1-amino-4-methoxyanthraquinone,
2-amino-3,4-phthaloylacridones,
1,4-diamino-2-acetylaminoanthraquinone,
aminoanthrapyrimidines,
1-aroylamino-4- or -5-aminoanthraquinone,
1,4-diamino-2-acetylanthraquinone,
1-amino-7-chloroanthraquinone,
1-amino-2-methyl-3-chloroanthraquinone, 4-aminoanthraquinone-2,1(N)-acridones, 4,4'-, 4,5'- or 5,5'-diamino-1,1'-dianthrimidecarbazole,
aminopyranthrones,
mono- and diaminoacedianthrone,
aminoisodibenzanthrone,
aminodibenzanthrone,
aminoanthranthrone,
aminoflavanthrone,
aminopyranthrone,
amino-isothiazolanthrones,
4-, 5- or 8-amino-1,1'-dianthrimidecarbazole,
aminoindanthrones,
4- or 5-amino-5'-benzoylamino-dianthrimidecarbazole,
4-amino-4'-benzoylamino-dianthrimidecarbazole,
aminodibenzpyrenquinone, also mono- and diaminotrianthrimidecarbazoles, for example, 8',8''-diamino - 1',1,4,1'' - trianthrimidecarbazole, also perylenetetracarboxylic acid di- (p- or m-aminophenyl)-amide and naphthalenetetracarboxylic acid diimides, also the compounds of the formulae

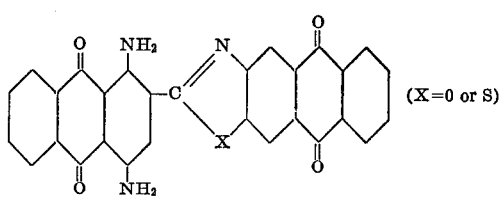

(X=O or S)

and

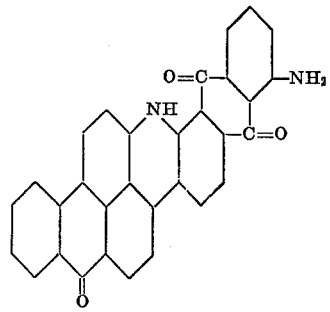

and those of the formula

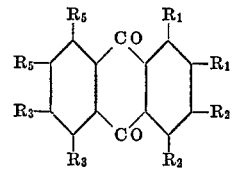

in which one of the symbols $R_1$ represents a hydrogen atom and the other a grouping of the formula

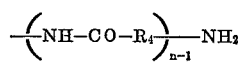

$n=1$ or 2, one of the symbols $R_2$, $R_3$ and $R_5$ is a halogen atom, an alkoxy, aryloxy, arylmercapto or acylamino group, especially a benzoylamino group, for example, the chloro-, methyl-, sulpho- or fluorobenzoylamino group or the unsubstituted $C_6H_5$—CO group itself, whereas the other of the symbols $R_2$, $R_3$ and $R_5$ represents a hydrogen or halogen atom, and one of the pairs of symbols $R_2R_2$, $R_3R_3$ or $R_5R_5$ may represent a grouping

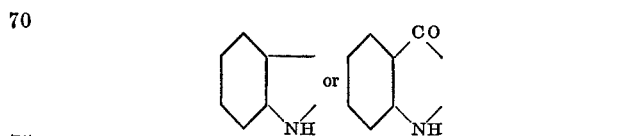

and $R_4$ represents an arylene residue, preferably of the benzene series, and the compound

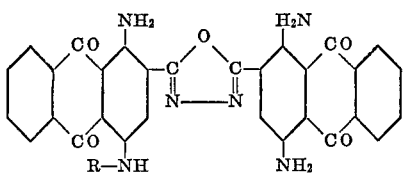

in which R may represent a benzoyl group or a hydrogen atom.

The reaction of the heterocyclic compound with the hydroxy or mercapto compound and the polycyclic quinone may be carried out in any desired order of succession.

Thus, for example, the hydroxy or mercapto compound may be reacted first with the reactive heterocyclic compound and the resulting product then reacted with the vattable compound. Alternatively, the heterocyclic compound may first be reacted with the vattable compound and the resulting product may then be condensed with the hydroxy or mercapto compounds. It is, however, advantageous to carry out the reaction with the hydroxy or mercapto compound of the residue R as the last step. The condensation with the vattable quinone is advantageously carried out at an elevated temperature.

The condensation reactions are advantageously carried out in an inert solvent, and, if desired, in the presence of an acid acceptor, for example, sodium carbonate or acetate, dimethylformamide or advantageously of a tertiary amine, preferably pyridine.

Media suitable for the reaction are, depending on the type and order of succession, aqueous systems (for example water+acetone) or organic solvents, for example, nitrobenzene, di- or tri-chlorobenzene, dimethylaniline, N-methylpyrrolidone and pyridine, or possibly phenol.

The dyestuffs according to this invention are also obtained when, instead of a chromophore containing an amino group, the corresponding halogen compound is used as the starting material (for example, chloroanthraquinone instead of aminoanthraquinone) and this halogen compound is reacted with an aminopyrimidine before or after its condensation with the hydroxy or mercapto compound. According to another manufacturing method, a pyrimidine that contains an eliminable substituent, for example, a halogenopyrimidine, is reacted at a molecular ratio of 1:1 with a hydroxy or mercepto compound and, after having replaced two eliminable substituents of the pyrimidine by amino groups, condensed with a polycyclic vattable aromatic compound that contains eliminable substituents, for example, with a halogenoanthraquinone. By combining two dissimilar vattable compounds valuable mixed shades can be produced. When the vattable compound contains at least two amino groups and the reaction is performed with a heterocyclic compound (which also contains at least two condensible substituents), it is possible to manufacture dimeric or even polymeric dyestuffs.

It may be advantageous to pass a current of air or an inert gas, for example, nitrogen, either occasionally or continuously, during the duration of the reaction through the reaction mixture. The dyestuffs of this invention may also contain one or more sulpho groups. Occasionally, dyestuffs that deposit better on the fibre are obtained when dyestuffs that are free from sulpho groups are subsequently sulphonated by a conventional method.

The dyeings obtained with the dyestuffs according to this invention are distinguished by their vivid, clear shades. Their advantageous application properties should be specially emphasised. By the present process there are obtained inter alia dyestuffs whose application is substantially independent of the temperature. The application may be performed by a wide variety of processes, for example, by the exhaustion or pad dyeing method, for example, by the pad-jig method, the pad-steam or the cold pad batch method. It is also noteworthy that all methods of application are distinguished by good dyestuff yields and that a large number of dyestuffs manufactured according to this invention can be synthesised in almost theoretical yields. It is a special advantage that the variability of the colour shades is very broad so that substantially all colour shades can be produced with the dyestuffs according to this invention.

The products obtained according to this invention are suitable for dyeing or printing a wide variety of materials, especially for dyeing or printing fibres of natural or regenerated cellulose in the presence of a reducing agent, for example dithionite. The dyeings obtained are distinguished by their very good wet fastness, especially to boiling with soda and chlorine, and by their good to very good light fastness properties.

The dyestuffs of the present invention can also be used as pigments. By virtue of their advantageous properties they can be used in a wide variety of pigment applications, for example, in a finely divided form for dyeing acetate and viscose rayon or cellulose ethers or esters or fibres of superpolyamides or superpolyurethanes or polyesters in the spinning mass, as well as for the manufacture of dyed lacquers or lake formers, solutions or products of acetylcellulose, nitrocellulose, natural resins or synthetic resins, for example, polymerisation or condensation resins, for example, aminoplasts, alkyd resins, phenoplasts, polyolefins, for example, polystyrene, polyvinylchloride, polyethylene, polypropylene, polyacrylonitrile, rubber, casein, silicone and silicone resins. Moreover, they can be successfully used for the manufacture of colour pencils, cosmetics or laminated panels.

The following examples illustrate the invention.

Unless otherwise indicated, parts and percentages are by weight. The symbol Py represents the residue

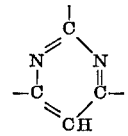

EXAMPLE 1

6.3 parts of the reaction product of 1 mol of trichloropyrimidine with 2 mols of 1-amino-3-chloroanthraquinone in 120 parts of nitrobenzene are heated to 205 to 210° C. together with 1.7 parts of 2-naphthol and 0.3 part of pyridine while stirring the mixture. The whole is maintained for 5½ hours at this temperature, and during the condensation a weak current of nitrogen or air is passed through the reaction mixture.

The batch is allowed to cool to about 100° C., then then filtered while still hot, washed with nitrobenzene and then with methanol and dried under vacuum. The isolated dyestuff of the formula

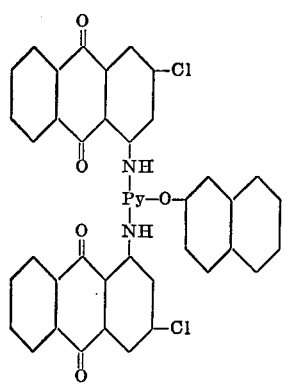

dyes cotton or viscose acetate rayon or spun rayon by the conventional vat dyeing methods yellow shades.

| | Reactive component | Hydroxy or mercapto compound respectively | Shade on cotton |
|---|---|---|---|
| 1 | 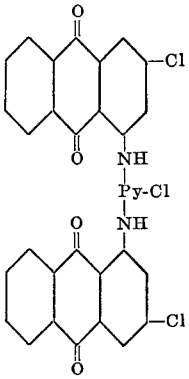 |  | Yellow. |
| 2 | Same as Example 1 | 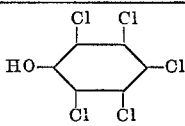 | Yellow. |
| 3 | 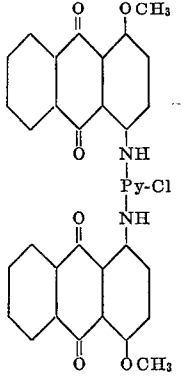 | 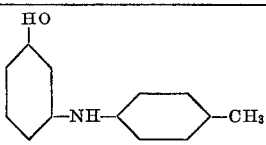 | Yellow. |
| 4 | Same as Example 3 | HO—⌬—CO$_2$CH$_2$CH$_2$CH$_3$ | Yellow. |
| 5 | Same as Example 3 | 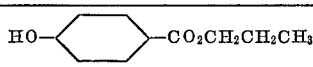 | Yellow. |
| 6 | 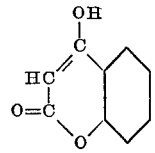 | 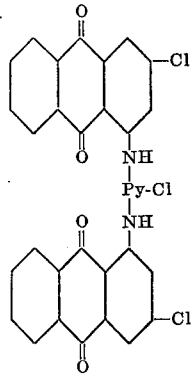 | Yellow. |
| 7 | Same as Example 6 | 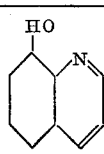 | Yellow. |

TABLE—Continued

| | Reactive component | Hydroxy or mercapto compound respectively | Shade on cotton |
|---|---|---|---|
| 8 | anthraquinone-NHCO-Ph / NH-Py-Cl / NH-anthraquinone-NHCO-Ph | HO-C₆H₃(Cl)-C₆H₅ | Red. |
| 9 | anthraquinone fused structure with NH-Py-Cl bridge | HO-C₆H₄-C₆H₅ | Blue. |
| 10 | anthraquinone-NH-Py(Cl)₂ | 1 mol— HO-anthraquinone | Yellow. |
| 11 | Same as Example 10 | 2 mols— HO-anthraquinone | Yellow. |
| 12 | Same as Example 10 | 1 mol— HO-anthraquinone<br>1 mol— HO-C₆H₄-C₆H₅ | Yellow. |

TABLE—Continued

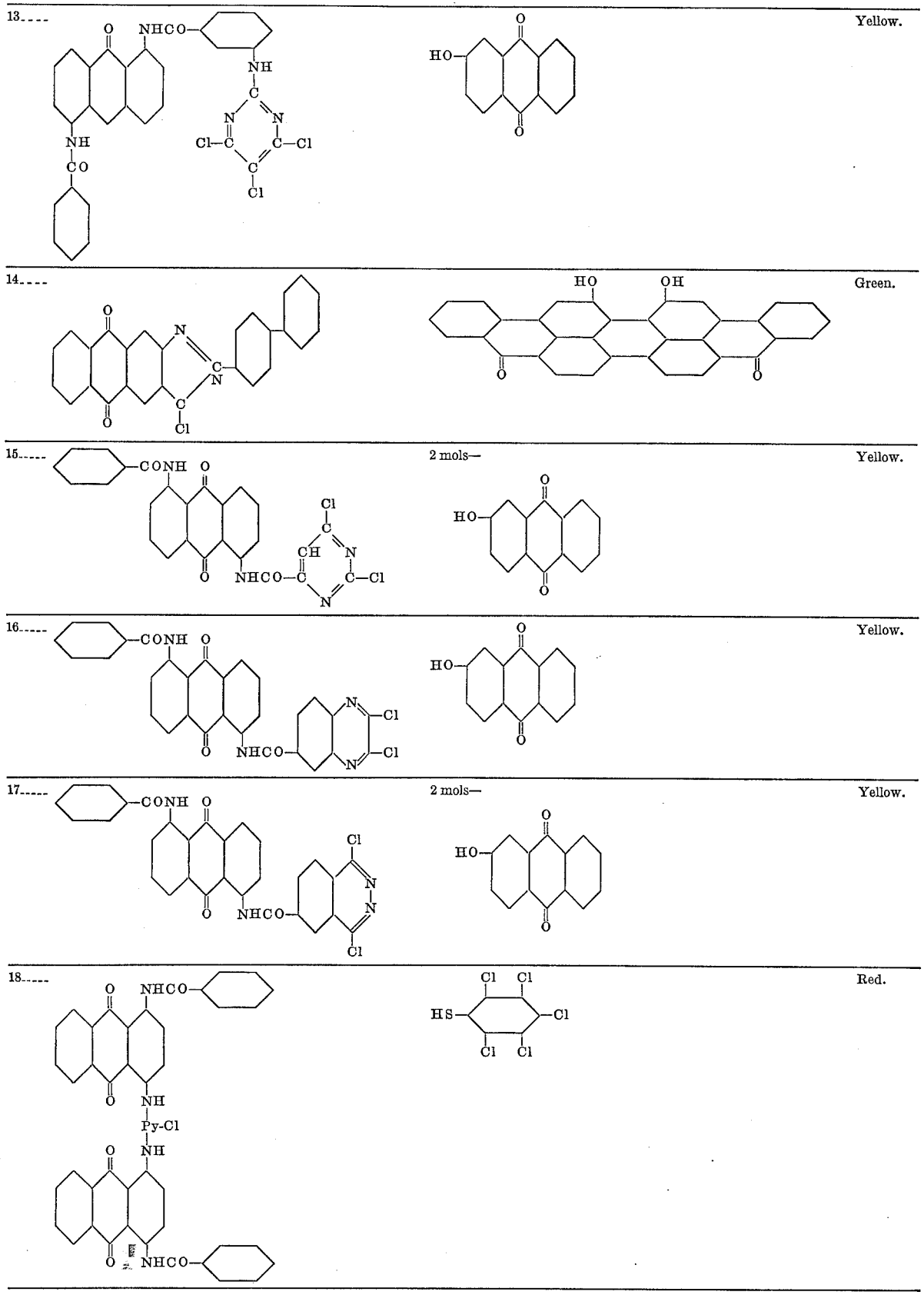

Dyeing instruction 1 part of dyestuff is vatted at 50 to 70° C. with 10 parts by volume of sodium hydroxide solution of 36° Bé. and 5 parts of sodium hydrosulphite in 200 parts of water. This stock vat is added to a dyebath containing in 2000 parts of water 5 parts by volume of sodium hydroxide solution of 36° Bé and 3.7 parts of sodium bisulphite, and 100 parts of cotton are immersed in it at 40° C.

After 10 minutes 15 parts of sodium chloride and 20 minutes later another 15 parts of sodium chloride are added and dyeing is performed for 45 minutes at 40° C. The cotton is then expressed, oxidised and finished off in the usual manner.

Pigment dyeing 5 parts of the dyestuff mentioned in Example 1 are mixed with 95 parts of dioctylphthalate and ground in a ball mill until the dyestuff particles are smaller than 3μ.

0.8 part of this dioctylphthalate paste is mixed with 13 parts of polyvinyl chloride, 7 parts of dioctylphthalate and 0.1 part of cadmium stearate and then rolled for 5 minutes on a two-roll mill at 140° C.

The resulting greenish yellow material has good migration stability and good fastness to light.

When the dyestuff mentioned above is replaced by the dyestuff of Example 9, the other steps being identcial, a greenish yellow material is obtained which has good migration and light fastness properties.

What is claimed is:

1. A vat dyestuff of the formula

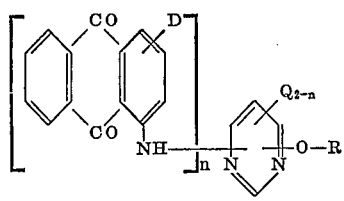

or

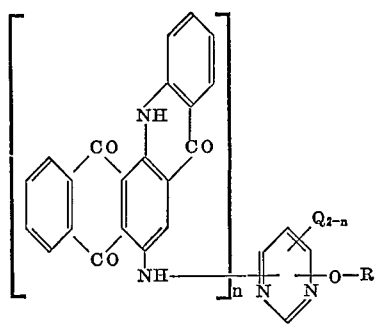

wherein D is hydrogen, chloro, methoxy or benzoylamino, $n$ is 1 or 2, R is naphthyl, biphenyl, p-toluidino-phenyl, coumarinyl, quinolinyl, chlorobiphenyl or anthraquinonyl, and Q is chloro or anthraquinonyloxy.

2. A vat dyestuff of claim 1, wherein $n$ is 2, and R is naphthyl, biphenyl, or chlorobiphenyl.

3. A vat dyestuff of claim 2 of the formula

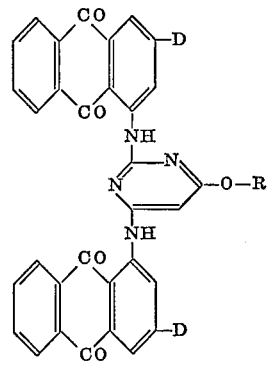

wherein D is hydrogen or chloro and R is biphenyl or chlorobiphenyl.

4. A vat dyestuff of claim 2 of the formula

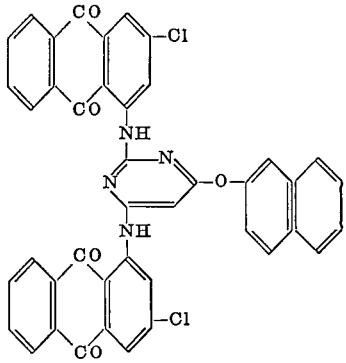

5. A vat dyestuff as claimed in claim 1 which corresponds to the general formula

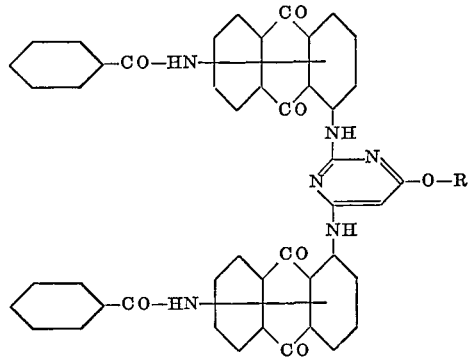

6. A vat dyestuff according to claim 1 of the general formula

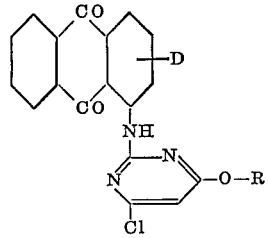

in which D represents a hydrogen or chlorine atom.

7. A vat dyestuff according to claim 1 of the formula

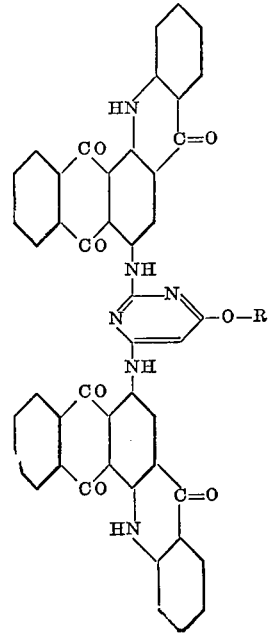

8. A vat dyestuff according to claim 1 of the general formula
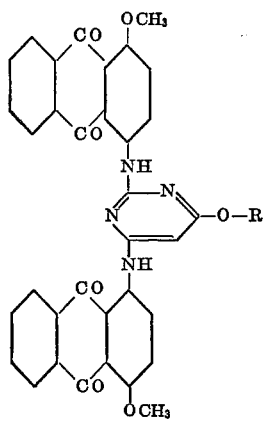
References Cited
UNITED STATES PATENTS
3,483,179   12/1969   Braun et al. _____ 260—256.4 C
FOREIGN PATENTS
1,191,060   6/1960   Germany _____ 260—256.4 C
RICHARD J. GALLAGHER, Primary Examiner
U.S. Cl. X.R.
8—34; 260— 37, 40, 41, 256.5 R, 262, 274, 303, 307.5